United States Patent
Nishikawa

(10) Patent No.: US 7,064,743 B2
(45) Date of Patent: Jun. 20, 2006

(54) FINGER MOVEMENT DETECTION METHOD AND APPARATUS

(75) Inventor: Shou Nishikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 364 days.

(21) Appl. No.: 10/352,943

(22) Filed: Jan. 29, 2003

(65) Prior Publication Data
US 2003/0185425 A1    Oct. 2, 2003

(30) Foreign Application Priority Data
Mar. 27, 2002  (JP) .............................. 2002-089517

(51) Int. Cl.
*G09G 5/08* (2006.01)
(52) U.S. Cl. ...................... 345/157; 382/124; 345/163
(58) Field of Classification Search ................ 345/156, 345/157, 161, 163, 167, 173; 382/115, 124, 382/125, 127
See application file for complete search history.

(56) References Cited

U.S. PATENT DOCUMENTS

| | | | | |
|---|---|---|---|---|
| 5,543,588 A | * | 8/1996 | Bisset et al. ................... | 178/18 |
| 6,057,540 A | * | 5/2000 | Gordon et al. ............... | 345/168 |
| 6,185,319 B1 | * | 2/2001 | Fujiwara ..................... | 382/127 |
| 6,326,950 B1 | * | 12/2001 | Liu ............................ | 345/163 |

FOREIGN PATENT DOCUMENTS

| | | |
|---|---|---|
| EP | 0 470 430 A2 | 2/1992 |
| EP | 0 905 646 A1 | 3/1999 |
| EP | 0 973 123 A1 | 1/2000 |
| JP | 4-158434 | 6/1992 |
| JP | 10-275223 | 10/1998 |
| JP | 11-161610 | 6/1999 |
| JP | 2000-48208 | 2/2000 |
| WO | WO 01/87159 A1 | 11/2001 |

OTHER PUBLICATIONS

Patent Abstracts of Japan of JP08110949 dated Apr. 30, 1996.

* cited by examiner

*Primary Examiner*—Kent Chang
(74) *Attorney, Agent, or Firm*—Staas & Halsey LLP

(57) ABSTRACT

A fingerprint area and a barycentric position of the area are obtained for a current sensor image, and an area near the barycentric position is divided into a plurality of small blocks. An image area that agrees with a fingerprint image is searched for, for each of the small blocks with respect to the fingerprint area in a previous sensor image. A candidate vector is obtained from a deviation between the position of the small block in the current sensor image and the position of the image area in the previous sensor image corresponding to the small block. A candidate vector with the highest matching degree between the fingerprint images in the current and previous sensor images is selected from the candidate vectors to obtain a detected vector, and the detected vector is corrected to exclude an influence of erroneous detection and to control a movement of a pointer.

12 Claims, 5 Drawing Sheets

201 — SENSOR IMAGE 101
102 — FINGERPRINT JUDGMENT BLOCK

102 ⤴    101 ↴

| s(1,1) | s(2,1) | s(3,1) | s(4,1) | s(5,1) | s(6,1) |
|--------|--------|--------|--------|--------|--------|
| s(1,2) | s(2,2) | s(3,2) | s(4,2) | s(5,2) | s(6,2) |
| s(1,3) | s(2,3) | s(3,3) | s(4,3) | s(5,3) | s(6,3) |
| s(1,4) | s(2,4) | s(3,4) | s(4,4) | s(5,4) | s(6,4) |

US 7,064,743 B2

FINGER MOVEMENT DETECTION METHOD AND APPARATUS

CROSS-REFERENCE TO RELATED APPLICATIONS

This application is based upon and claims the benefit of priority from the prior Japanese Patent Application No. 2002-089517, filed on Mar. 27, 2002, the entire contents of which are incorporated herein by reference.

BACKGROUND OF THE INVENTION

1) Field of the Invention

The present invention relates to a method and apparatus for detecting a movement of a finger by performing pattern matching between a past fingerprint image and a current fingerprint image. More specifically, the present invention relates to a finger movement method and apparatus suitable to be applied to a pointing device for small portable equipment using a fingerprint image.

2) Description of the Related Art

Conventionally, an electronic track pad equipped in a notebook-sized personal computer has been known as a pointing device. The track pad, however, requires a sensor face larger than a fingertip for detecting the position of the fingertip, and hence it is not preferable for small portable equipment, such as a mobile phone. Recently, an authentication system using a fingerprint image has been put to practical use, and it can be considered to use the fingerprint image also in the pointing device.

An idea for realizing the pointing function by detecting a finger movement based on a fingerprint image has been already proposed.

However, any method of detecting a finger movement from a fingerprint image and any configuration of a pointing device realized by the method have not yet been proposed specifically. Further, in order to equip small portable equipment such as a mobile phone with the pointing device, it is necessary to reduce the size of the sensor face for detecting a fingerprint than the size of the fingertip. However, any method and apparatus for detecting the finger movement on the sensor face having such a small size have not yet been proposed.

Since the pointing device is used all the time, any pointing device using the fingerprint image requires high pointing accuracy and calculation load that is as small as possible.

SUMMARY OF THE INVENTION

It is an object of the present invention to provide a specific method and specific configuration of an apparatus for detecting the finger movement from a fingerprint image.

In order to achieve the above object, the present invention has a feature as described below. That is, a fingerprint in an area smaller than a fingertip is detected by using a fingerprint sensor having an area smaller than a fingertip. A fingerprint area where a fingerprint image exists is specified in the detected current sensor image to thereby obtain a barycentric position of the area. The area near the barycentric position is divided into a plurality of small blocks smaller than the fingerprint area. The fingerprint area is also specified in an immediately preceding sensor image, and an image area that agrees with the fingerprint image in the small block is searched for, for each of the small blocks of the current sensor image, from the fingerprint area of the immediately preceding sensor image.

A candidate vector is determined from a deviation between the position of the small block in the current sensor image and the position of the image area in the immediately preceding sensor image corresponding to the small block. A candidate vector having the highest matching degree between the fingerprint image in the current sensor image and the fingerprint image in the immediately preceding sensor image is selected from the candidate vectors obtained for each small block, and designated as a detected vector. Correction for excluding the influence of fine fingertip movement and misdetection is carried out with respect to the detected vector to obtain a corrected vector for finally carrying out movement control of the pointer.

According to this invention, a fingerprint in an area smaller than a fingertip is detected, and a fingerprint area is specified respectively for the current sensor image and the past sensor image. Areas in which the fingerprint images agree with each other are obtained in the respective fingerprint areas, and a vector representing the fingertip movement is obtained based on a displacement between the areas in which the fingerprint images agree with each other.

These and other objects, features and advantages of the present invention are specifically set forth in or will become apparent from the following detailed descriptions of the invention when read in conjunction with the accompanying drawings.

DETAILED DESCRIPTIONS

Figure 1:
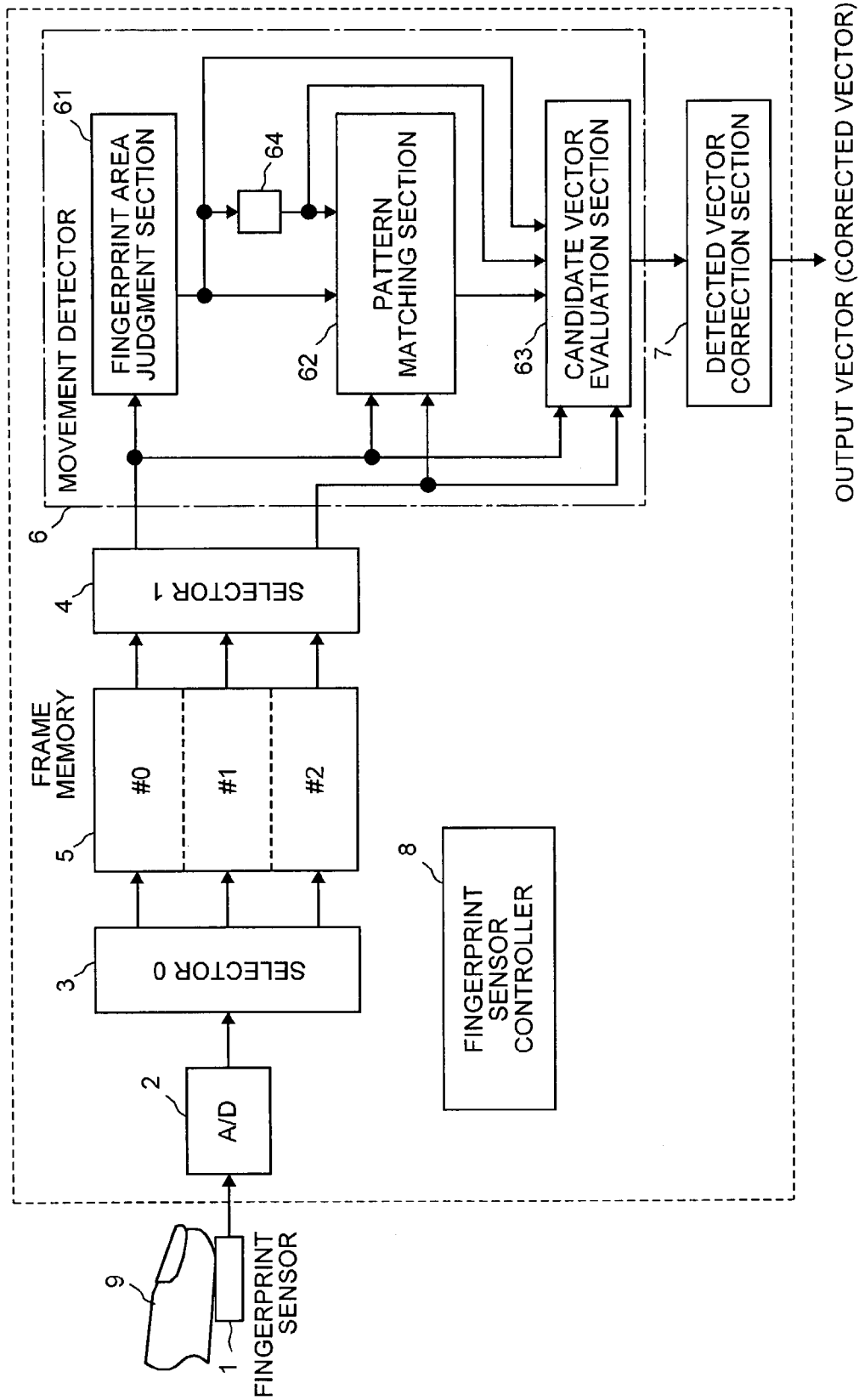
FIG. 1 is a block diagram functionally showing the configuration of a finger movement detection apparatus according to an embodiment of the present invention.

An embodiment of the present invention will be explained in detail below with reference to the drawings. FIG. 1 is a block diagram functionally showing the configuration of the finger movement detection apparatus according to the embodiment of the present invention. As shown in FIG. 1, this detection apparatus comprises an electronic fingerprint sensor 1, an A/D converter 2, two selectors 3 and 4, a frame memory 5, a movement detector 6, a detected vector correction section 7, and a fingerprint sensor controller 8 that controls overall operation timing.

The fingerprint sensor 1 is smaller than a fingertip 9, and detects a fingerprint in an area smaller than the fingertip 9. The A/D converter 2 converts sensor image data consisting of an analog signal captured by the fingerprint sensor 1 into data consisting of a digital signal. The frame memory 5 has three banks, for example, #0, #1 and #2, though not particularly limited. Of the three banks, one bank is used for writing, and the other two banks are used for movement detection. Therefore, the movement detection processing described later can be executed while the sensor image data is being written in the frame memory 5.

The first selector 3 selects a vacant bank from the three banks in the frame memory 5, that is, a bank not used for the movement detection processing by the movement detector 6. As a result, the sensor image data transmitted from the A/D converter 2 is written in the vacant bank.

The second selector 4 selects two banks that are not used by the first selector 3, that is, selects two banks in which the sensor image data is not being written. The sensor image data has been already stored in these two banks. The second selector 4 designates newer sensor image data based on time series, of the sensor image data stored in the two banks, as current sensor image data, designates older sensor image data as past sensor image data, and supplies these data to the movement detector 6.

After sensor image data for one image supplied from the A/D converter 2 has been captured and calculation of a detected vector (detected vector will be described later) by the movement detector 6 has been finished, the second selector 4 opens the bank of frame memory 5, used as a storage area of the past sensor image.

The bank that stores the current sensor image data is selected as a bank for storing the past sensor image data at the time of next movement detection processing. The bank in which the sensor image data is being written is newly selected as a bank for storing the current sensor image data. The opened bank is used for storing the next sensor image data supplied from the A/D converter 2.

The movement detector 6 further has a fingerprint area judgment section 61, a pattern matching section 62, and a candidate vector evaluation section 63. The fingerprint area judgment section 61 judges a fingerprint area in the current sensor image, using the current sensor image data as the input data, and obtains a barycentric position of the judged fingerprint area. The judgment method of the fingerprint area and a method of determining the barycentric position will be described later.

The pattern matching section 62 performs pattern matching between the current fingerprint image and the past fingerprint image, using the data for the fingerprint area and barycentric position of the current sensor image output from the fingerprint area judgment section 61 and the past sensor image data as an immediately preceding sensor image, and outputs a plurality of candidate vectors. The pattern matching method and the candidate vector will be described later. In FIG. 1, reference numeral 64 denotes a memory that temporarily stores the immediately preceding data from the current sensor image.

The candidate vector evaluation section 63 evaluates a plurality of candidate vectors, based on the data for a plurality of candidate vectors output from the pattern matching section 62 and the data relating to the current and past sensor images input to the pattern matching section 62, and outputs the most preferable candidate vector as a detected vector. The evaluation method of the candidate vector will be described later. The detected vector correction section 7 corrects data for the detected vector output from the candidate vector evaluation section 63, and outputs the corrected data as a corrected vector. The correction method of the detected vector will be described later.

Figure 2:
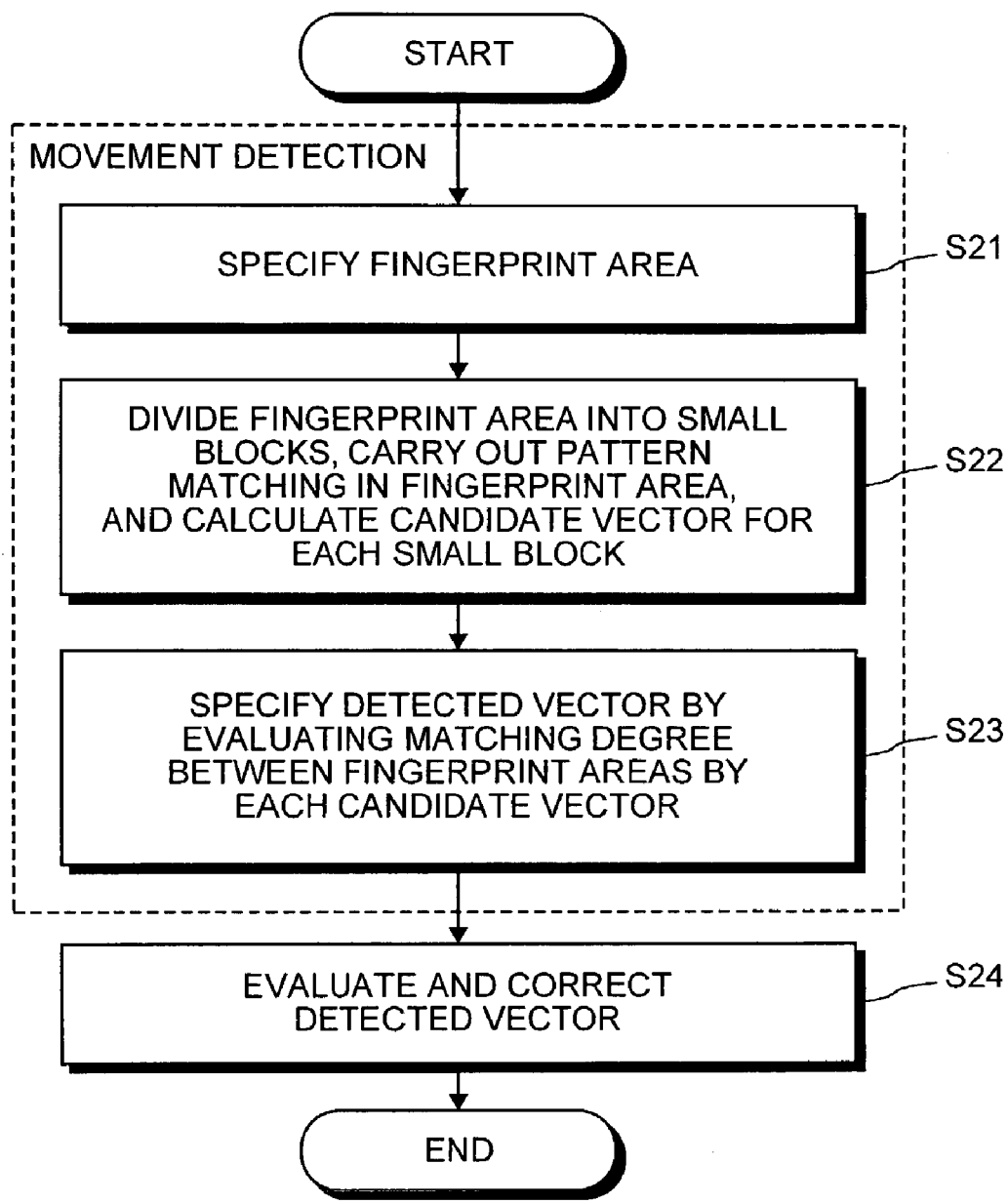
FIG. 2 is a flowchart showing the procedure of the finger movement detection method according to the embodiment.

FIG. 2 is a flowchart showing the procedure of the finger movement detection method according to the embodiment of the present invention. As shown in FIG. 2, the current sensor image data is obtained by detecting a fingerprint in an area smaller than a fingertip 9 by the fingerprint sensor 1.

The fingerprint area judgment section 61 specifies the fingerprint area in the current sensor image and obtains the barycentric position of the fingerprint area based on the obtained sensor image data (step S21).

Figures 3, 4:
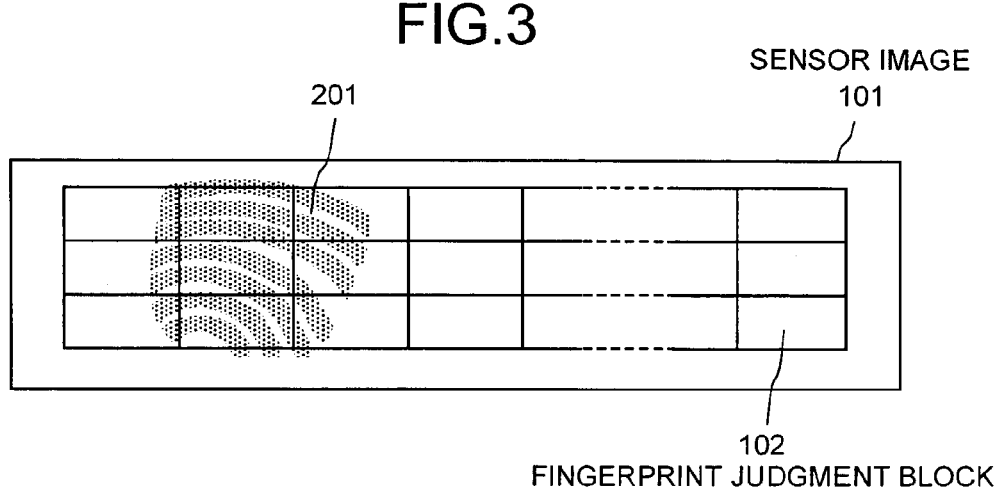
FIG. 3 is diagram for explaining a method of specifying a fingerprint area in a sensor image according to the embodiment.
FIG. 4 is a diagram for explaining a method of obtaining a barycentric position of a fingerprint area in the embodiment.

In order to specify the fingerprint area in the sensor image, as shown in FIG. 3, the sensor image 101 is divided into a plurality of fingerprint judgment blocks 102, and the distribution of the pixel data in each fingerprint judgment block 102 is studied, to thereby judge the existence of a fingerprint image 201. After all fingerprint judgment blocks 102 have been judged, the area where the fingerprint image 201 exists is designated as the fingerprint area.

In order to obtain the barycentric position of the fingerprint area, as shown in FIG. 4, by using a distribution value s (x, y) of pixel data in each fingerprint judgment block 102 obtained by dividing the sensor image 101 into fingerprint judgment blocks 102 in, for example, a 6×4 matrix, though not particularly limited, the following equations (1) and (2) are calculated.

In the example shown in the figure, x denotes an integer of from 1 to 6, and y denotes an integer of from 1 to 4. The barycentric position in the horizontal direction (the horizontal barycentric position) is obtained from the equation (1), and the barycentric position in the vertical direction (the vertical barycentric position) is obtained from the equation (2). The horizontal direction is a laterally longer direction in the sensor image 101 shown in FIG. 4, and the vertical direction is a longitudinally shorter direction. As the distribution value s(x, y), a mean value or a distributed value may be used.

$$\text{Horizontal barycentric position} = \frac{\sum_{x=1}^{6}\left(x \times \left(\sum_{y=1}^{4} s(x, y)\right)\right)}{\sum_{x=1}^{6}\sum_{y=1}^{4} s(x, y)} \quad (1)$$

$$\text{Vertical barycentric position} = \frac{\sum_{y=1}^{4}\left(y \times \left(\sum_{s=1}^{6} s(x, y)\right)\right)}{\sum_{s=1}^{6}\sum_{y=1}^{4} s(x, y)} \quad (2)$$

When the barycentric position of the fingerprint area is to be obtained, a threshold at the distribution value s(x, y) of the pixel data may be set so as to calculate the equation (1) and the equation (2) only for a fingerprint judgment block 102 whose distribution value s(x, y) exceeds the threshold. Thereby, the barycentric position can be obtained at higher accuracy. In this case, the distribution value s(x, y) not larger than the threshold may be set to be zero.

Returning to FIG. 2, following step S21, the pattern matching section 62 extracts a plurality of small blocks from the fingerprint area in the current sensor image, and carries out pattern matching between the fingerprint image in the small block and the fingerprint image in the fingerprint area in the immediately preceding sensor image (in the past sensor image), for each small block, to thereby obtain a candidate vector for each small block (step S22).

The reason why the pattern matching is carried out in a small block having an area smaller than that of the sensor image is to allow the pattern matching section 62 to follow even a large movement of the fingertip 9. In order to carry out pattern matching, as shown in, for example, FIG. 5, an image area having a pattern that agrees with the fingerprint pattern in a small block 123 of the fingerprint area 122 in the current sensor image 121 is searched for by scanning as shown by the arrow, from the fingerprint area 112 in the past sensor image 111.

A candidate vector is obtained from a deviation between a position of the image area having the best matching result with the fingerprint image in the small block 123 of the current sensor image 121, within the fingerprint area 112 in the past sensor image 111, and a position of the small block 123 in the current sensor image 121. In the example shown in FIG. 5, the number of the small blocks 123 in the current sensor image 121 is plural, for example, 3. Since one candidate vector can be obtained from each small block 123, three candidate vectors can be obtained in the example shown in the figure. Here, the area in which the pattern matching is to be carried out is limited to the fingerprint area 112 in the past sensor image 111. This is because the calculation amount in pattern matching is made as small as possible to reduce the time required for the calculation processing, so as to be able to follow the movement of the fingertip 9 as much as possible.

Figure 5:
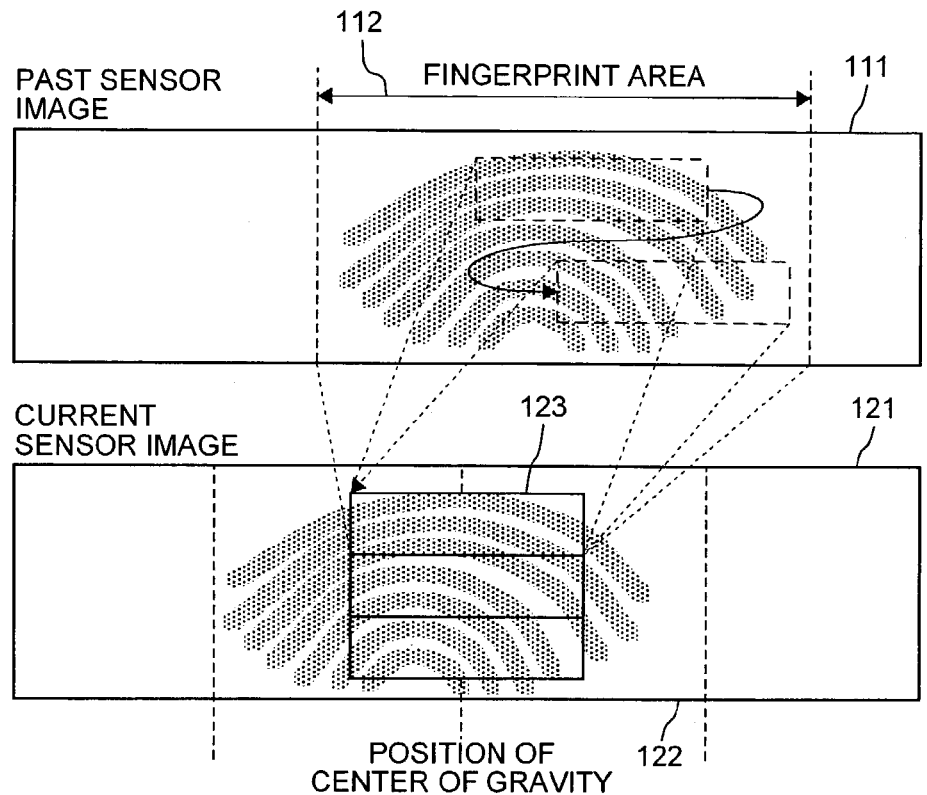
FIG. 5 is a diagram for explaining a pattern matching method in the embodiment.

In the example shown in FIG. 5, the three small blocks 123 in the current sensor image 121 are defined near the barycenter of the fingerprint area 122 in the current sensor image 121. This is because there are wrinkles in the fingerprint and a portion where the fingerprint image cannot be captured due to the wrinkles may exist, and hence by avoiding such a portion, the calculation amount is further reduced.

In this manner, when the small blocks 123 in the current sensor image 121 are defined near the barycenter, an offset may be given to the barycentric position corresponding to the past movement of the fingertip 9, that is, so as to enlarge the area to which the fingertip 9 is moving, in order to enable to follow the movement of the fingertip 9 as much as possible. In the example shown in FIG. 5, since the sensor face is longer in the lateral direction (horizontal direction), only the horizontal barycentric position is obtained, and the vertical barycentric position is not taken into consideration.

Returning to FIG. 2, following step S22, the candidate vector evaluation section 63 evaluates matching degree between the fingerprint area in the current sensor image and the fingerprint area in the past sensor image, based on the respective candidate vectors. The candidate vector having the best evaluation result is specified as a detected vector (step S23).

Figure 6:
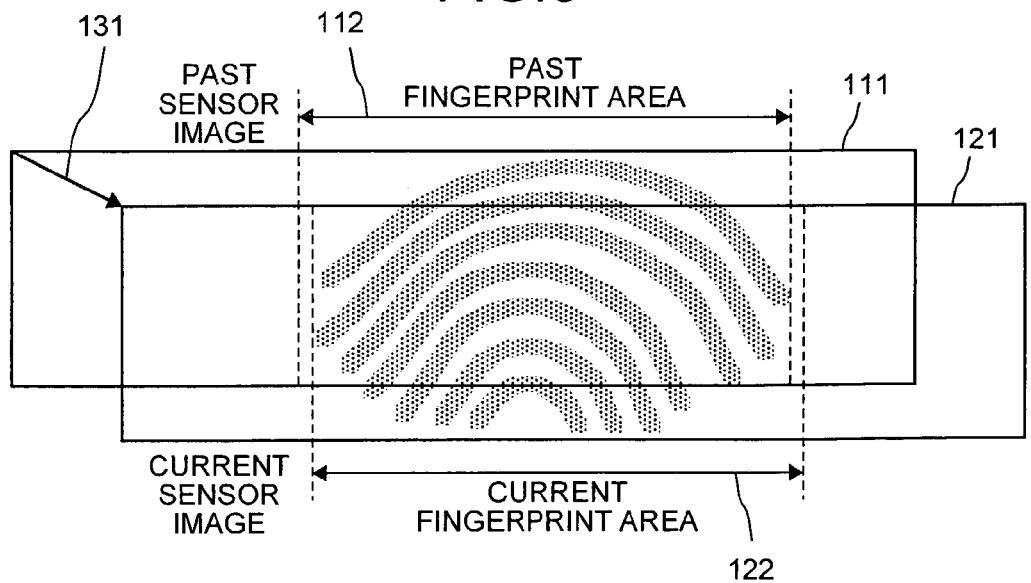
FIG. 6 is a diagram for explaining a candidate vector evaluation method in the embodiment.

In evaluating the candidate vector, as shown in FIG. 6, a reference point of the current sensor image 121 (for example, a left upper corner) is displaced from a reference point of the past sensor image 111 (for example, a left upper corner) by the portion of the candidate vector 131, for each of the candidate vectors obtained at step S22. Thereby, the fingerprint area 122 in the current sensor image 121 is superimposed on the fingerprint area 112 in the past sensor image 111, and the matching degree between the fingerprint images in the both fingerprint areas 112 and 122 is evaluated.

Since there are three small blocks in FIG. 5, the candidate vectors are also three, and the matching degree is evaluated for each candidate vector 131. A candidate vector 131 having the best matching degree is designated as the detected vector.

Returning to FIG. 2, following step S23, the detected vector correction section 7 carries out evaluation and correction of the detected vector (step S24), to finally obtain a corrected vector for performing the movement control of the pointer displayed on a screen. The reason why the detected vector is evaluated and corrected is to detect fine movement of a fingertip and to prevent the pointer from being moved in a direction unintended by an operator due to misdetection. The movement control of the pointer is carried out based on the corrected vector obtained at step S24.

Figure 7:
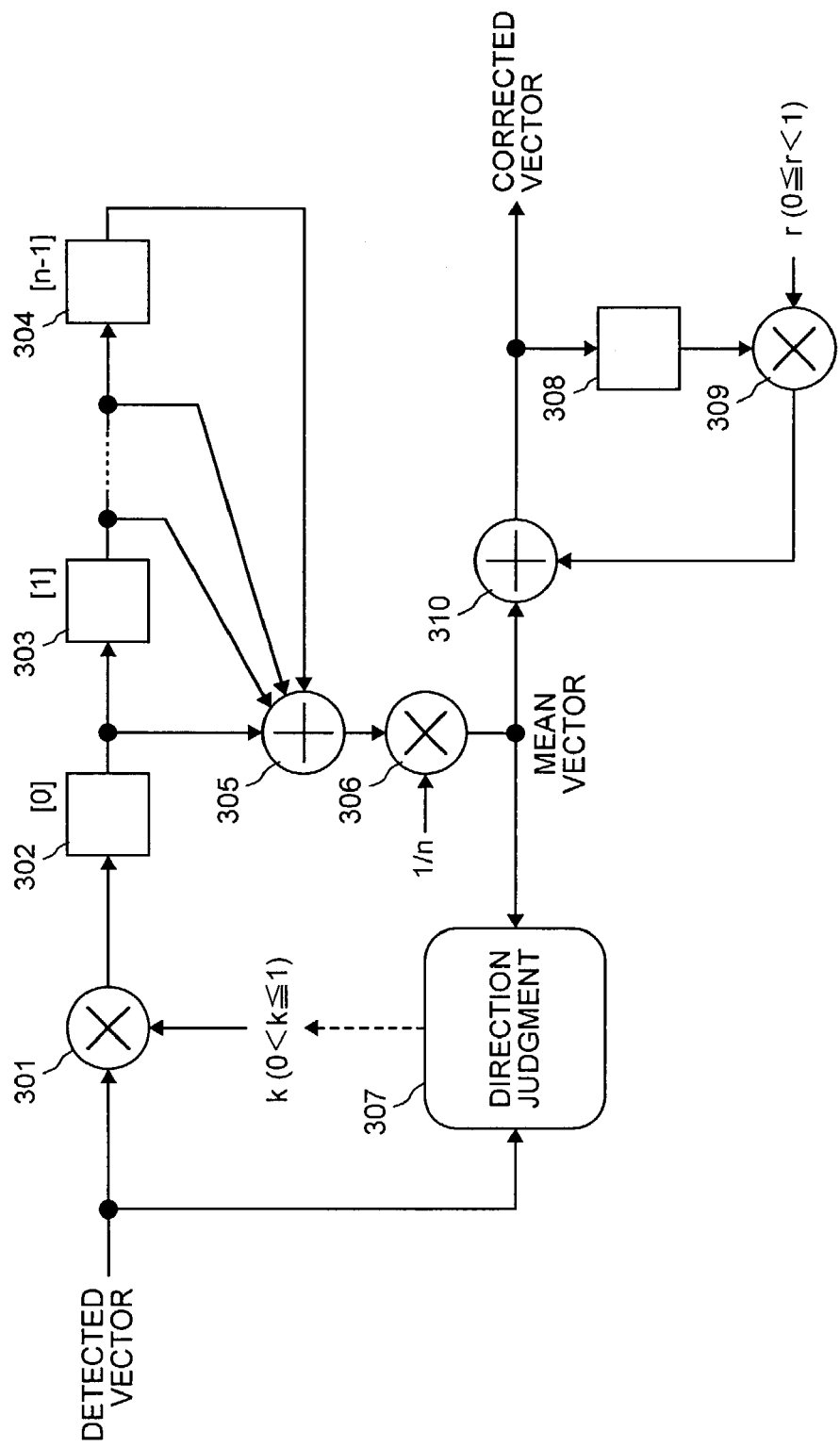
FIG. 7 is a diagram for explaining an evaluation and correction method of detected vector in the embodiment.

When the detected vector is evaluated and corrected, as shown in FIG. 7, a direction judgment with respect to a mean vector obtained by averaging n detected vectors in the past is carried out, and the detected vector obtained this time at step S23 is multiplied by a first coefficient k ($0<k\leq 1$) corresponding to the judged direction.

The mean vector stands for a vector obtained by combining n vectors obtained by multiplying the mean vector obtained by averaging n detected vectors in the past by the coefficient k corresponding to the direction, for each of the n detected vectors in the past, as in the detected vector this time, and dividing the combined vector by n. The value n is determined by the balance between the calculation amount and the operability for detection of the fingertip movement.

As described above, the evaluation and correction of the detected vector is performed, taking the direction into consideration. This is because the influence of misdetection in the movement detection is reduced by increasing a value of k based on judgment such that the possibility of misdetection may be low if the direction of the detected vector this time is the same as or close to the direction of the mean vector, and by decreasing the value of k based on judgment such that the possibility of misdetection may be high if the direction of the detected vector this time is the opposite direction or close to the opposite direction of the mean vector. The direction judgment is carried out by a common calculation for determining an angle between two vectors.

In obtaining the corrected vector, as shown in FIG. 7, the mean vector, being an average of n detected vectors obtained by taking the direction into consideration, is combined with one obtained by multiplying the corrected vector last time obtained based on the mean vector last time by a second coefficient r ($0\leq r<1$), and the combined vector is designated as the final corrected vector. The reason why the mean vector is used for obtaining the corrected vector is that fine variations in the detected vector is suppressed by adding the influence of the past detected vector to the detected vector this time. The second coefficient r is multiplied for giving inertia to the movement of the pointer whose movement is controlled based on the corrected vector, to make the movement of the pointer smoother. Therefore, the value of r is appropriately selected so that the pointer moves smoothly.

A reference numeral 301 in FIG. 7 denotes calculation processing for multiplying the detected vector by the first coefficient k. Reference numerals 302 to 304 denote n vectors obtained by multiplying the detected vector by the first coefficient k. A reference numeral 305 denotes processing for combining the n vectors 302 to 304 obtained by multiplying the detected vector by the first coefficient k. A reference numeral 306 denotes processing for determining a mean vector from the combined vector obtained in the combination processing 305. A reference numeral 307 denotes processing for judging the direction of the detected vector with respect to the mean vector. A reference numeral 308 denotes a corrected vector last time. A reference numeral 309 denotes calculation processing for multiplying the previous corrected vector by the second coefficient r. A reference numeral 310 denotes processing for combining the mean vector with a vector obtained by multiplying the previous corrected vector 308 by the second coefficient r.

According to the embodiment, a fingerprint in an area smaller than the fingertip 9 is detected. The fingerprint areas 122 and 112 are respectively specified in the current sensor image 121 and the past sensor image 111, and an area in which the fingerprint areas agree with each other is obtained in the respective fingerprint areas 122 and 112. A vector representing the movement of a fingertip is obtained based on the displacement of the area where the fingerprint images thereof agree with each other. As a result, it is possible to detect the movement of the fingertip 9 from the fingerprint image. The pointing function can be realized in accordance with the intention of the operator using the fingerprint sensor 1 smaller than the fingertip, by controlling the movement of the pointer based on the vector representing the movement of the fingertip.

Therefore, the pointing function can be added to an authentication system using a fingerprint image. Since the fingerprint sensor 1 is smaller than the fingertip 9, the pointing function or a fingerprint authentication system with the pointing function can be added to small portable equipment such as a mobile phone.

The present invention is not limited to the embodiment and can be variously changed. For example, the specifying method of the fingerprint area, the method of determining the barycentric position of the fingerprint area, the pattern matching method, and the evaluation and correction method of the detected vector may be changed as required. Further, the present invention can be realized by software, or may be realized by hardware.

According to the present invention, a fingerprint in an area smaller than a fingertip is detected. The fingerprint areas are respectively specified in the current sensor image and the past sensor image, and an area in which the fingerprint areas agree with each other is obtained in the respective fingerprint areas. A vector representing the movement of a fingertip is obtained based on a displacement of the areas where the fingerprint images thereof agree with each other. As a result, the movement of the fingertip can be detected from the fingerprint image. Therefore, there is an effect that the pointing function can be realized in accordance with the intention of the operator using the fingerprint sensor smaller than the fingertip, by controlling the movement of the pointer based on the vector representing the movement of the fingertip.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A finger movement detection method comprising:
    detecting a fingerprint in an area smaller than a fingertip to obtain a first sensor image and a second sensor image;
    pattern matching by extracting a plurality of partial image areas of the obtained second sensor image as small blocks, searching for an image area having a fingerprint pattern that agrees with a fingerprint pattern in one of the small blocks of the second sensor image from the first sensor image, and obtaining a plurality of vectors indicating a movement of a finger, based on a plurality of displacements of the small blocks in the second sensor image from the image areas in the first sensor image;
    selecting a vector having a highest matching degree from the plurality of vectors as a vector indicating the finger movement, when a fingerprint image in the first sensor image and a fingerprint image in the second sensor image are superimposed on each other based on the respective vectors; and
    correcting a combined vector to a vector indicating the finger movement, the combined vector being obtained by combining a mean vector between a vector that is obtained by multiplying a newly selected vector by a first coefficient and a vector that is previously obtained by being multiplied by the first coefficient, with a vector obtained by multiplying a previously combined vector by a second coefficient.

2. The finger movement detection method according to claim 1, wherein the first coefficient is determined based on a direction of the selected vector with respect to the mean vector.

3. The finger movement detection method according to claim 1, further comprising judging a fingerprint area where a fingerprint image exists, from the first sensor image, after processing at the detecting a fingerprint, wherein
    the pattern matching includes searching for the image area corresponding to the small block extracted from the second sensor image, from the judged fingerprint area.

4. The finger movement detection method according to claim 3, wherein the judging includes judging a fingerprint area where the fingerprint image exists from the second sensor image, and obtaining a barycentric position of the fingerprint area in the second sensor image, and
    the pattern matching includes extracting the small block near the barycentric position obtained at the judging.

5. A finger movement detection apparatus comprising:
    a fingerprint sensor that detects a fingerprint in an area smaller than a fingertip to obtain a first sensor image and a second sensor image;
    a pattern matching unit that extracts a plurality of partial image areas of the second sensor image as small blocks, searches the first sensor image for a plurality of image areas having a fingerprint pattern that agrees with a fingerprint pattern in one of the small blocks in the second sensor image, and obtains a plurality of vectors indicating a movement of a finger, based on a plurality of displacements of the small blocks in the second sensor image from the image areas in the first sensor image;
    a vector evaluation unit that selects a vector having a highest matching degree from the vectors as a vector indicating the finger movement, when a fingerprint image in the first sensor image and a fingerprint image in the second sensor image are superimposed on each other based on each of the vectors; and
    a vector correction unit that corrects a combined vector to a vector indicating the finger movement, the combined vector being obtained by combining a mean vector between a vector that is obtained by multiplying a vector newly selected by the vector evaluation unit by a first coefficient and a vector that is previously obtained by being multiplied by the first coefficient, with a vector obtained by multiplying a previously combined vector by a second coefficient.

6. The finger movement detection apparatus according to claim 5, further comprising a frame memory that stores the first sensor image and the second sensor image obtained by the fingerprint sensor.

7. The finger movement detection apparatus according to claim 5, wherein the first coefficient is determined based on a direction of a vector newly selected by the vector evaluation unit with respect to the mean vector.

8. The finger movement detection apparatus according to claim 5, further comprising a fingerprint area judgment unit that judges a fingerprint area where a fingerprint image exists, from the first sensor image, wherein
the pattern matching unit searches for the image area corresponding to the small block extracted from the second sensor image, from the fingerprint area judged by the fingerprint area judgment unit.

9. The finger movement detection apparatus according to claim 8, wherein the fingerprint area judgment unit judges a fingerprint area where the fingerprint image exists from the second sensor image, and obtains a barycentric position of the fingerprint area in the second sensor image, and
the pattern matching unit extracts the small block near the barycentric position obtained by the fingerprint area judgment unit.

10. A pointing method, comprising:
obtaining a vector indicating a movement of a finger, by using a finger movement detection method including
detecting a fingerprint in an area smaller than a fingertip to obtain a first sensor image and a second sensor image;
extracting a plurality of partial image areas of the second sensor image as small blocks, searching the first sensor image for a plurality of image area each having a fingerprint pattern that agrees with a fingerprint pattern in one of the small blocks in the second sensor image, and obtaining a plurality of vectors indicating the movement of the finger, based on a plurality of displacements of the small blocks in the second sensor image from the image areas in the first sensor image;
selecting a vector having a highest matching degree from the vectors as a vector indicating the finger movement, when a fingerprint image in the first sensor image and a fingerprint image in the second sensor image are superimposed on each other based on each of the vectors; and
correcting a combined vector to a vector indicating the finger movement, the combined vector being obtained by combining a mean vector between a vector that is obtained by multiplying a vector newly selected at the selecting by a first coefficient and a vector that is previously obtained by being multiplied by the first coefficient, with a vector obtained by multiplying a previously combined vector by a second coefficient; and
controlling a movement of a pointer displayed on a screen, based on the vector.

11. A pointing apparatus comprising:
a finger movement detection apparatus including
a fingerprint sensor that detects a fingerprint in an area smaller than a fingertip to obtain a first sensor image and a second sensor image;
a pattern matching unit that extracts a plurality of partial image areas of the second sensor image as small blocks, searches the first sensor image for a plurality of image areas having a fingerprint pattern that agrees with a fingerprint pattern in one of the small blocks in the second sensor image, and obtains a plurality of vectors indicating a movement of a finger, based on a plurality of displacements of the small blocks in the second sensor image from the image areas in the first sensor image;
a vector evaluation unit that selects a vector having a highest matching degree from the vectors as a vector indicating the finger movement, when a fingerprint image in the first sensor image and a fingerprint image in the second sensor image are superimposed on each other based on the respective vectors; and
a vector correction unit that corrects a combined vector to a vector indicating the finger movement, the combined vector being obtained by combining a mean vector between a vector that is obtained by multiplying a vector newly selected by the vector evaluation unit by a first coefficient and a vector that is previously obtained by being multiplied by the first coefficient, with a vector obtained by multiplying a previously combined vector by a second coefficient; and
a control unit that controls a movement of a pointer displayed on a screen, based on the vector indicating the movement of the finger obtained by the detection apparatus.

12. A finger movement detection method, comprising:
detecting a fingerprint in an area smaller than a fingertip to obtain a first sensor image and a second sensor image;
extracting a plurality of small blocks of said second sensor image and searching said first sensor image for a plurality fingerprint patterns matching a plurality of fingerprint patterns in said small blocks; and
obtaining a plurally of vectors indicating a movement of a finger, based on a plurality of displacements of the fingerprint patterns in said small blocks of said second sensor image relative to the fingerprint patterns of said first sensor image;
selecting a vector having a highest matching degree from the vectors as a vector indicating the movement of the finger, when a fingerprint image in the first sensor image and a fingerprint image in the second sensor image are superimposed on each other based on each of the vectors; and
correcting a combined vector to a vector indicating the movement of the finger, the combined vector being obtained by combining a mean vector between a vector that is obtained by multiplying a vector newly selected at the selecting by a first coefficient and a vector that is previously obtained by being multiplied by the first coefficient, with a vector obtained by multiplying a previously combined vector by a second coefficient.

* * * * *

UNITED STATES PATENT AND TRADEMARK OFFICE
CERTIFICATE OF CORRECTION

| | | |
|---|---|---|
| PATENT NO. | : 7,064,743 B2 | Page 1 of 1 |
| APPLICATION NO. | : 10/352943 | |
| DATED | : June 20, 2006 | |
| INVENTOR(S) | : Shou Nishikawa | |

It is certified that error appears in the above-identified patent and that said Letters Patent is hereby corrected as shown below:

Column 9, Line 19, change "method" to --method,--.

Column 9, Line 49, change "apparatus" to --apparatus--.

Column 10, Line 36, change "plurally" to --plurality--.

Signed and Sealed this

Twenty-eighth Day of November, 2006

JON W. DUDAS
*Director of the United States Patent and Trademark Office*